July 27, 1926. Re. 16,397

E. J. MUCH

FISHING TOOL

Original Filed Feb. 13, 1923

Inventor
Edward J. Much
By Jack Ashley
Attorney

Reissued July 27, 1926. Re. 16,397

UNITED STATES PATENT OFFICE.

EDWARD J. MUCH, OF ARKANSAS CITY, KANSAS, ASSIGNOR, BY MESNE ASSIGNMENTS, TO THE GUIBERSON CORPORATION, OF DALLAS, TEXAS, A CORPORATION OF DELAWARE.

FISHING TOOL.

Original No. 1,526,361, dated February 17, 1925, Serial No. 618,832, filed February 13, 1923. Application for reissue filed February 8, 1926. Serial No. 86,921.

My invention relates to oil well fishing tools and its principal object is to provide a simple device for removing or fishing broken parts from oil wells such as valve stems, rods, broken drill sets, etc.

A further object of the invention is to provide a well fishing tool which when lowered in the well will engage the object to be fished out and automatically grip the same.

A still further object of the invention is to provide a well fishing tool embodying a plurality of sets of gripping elements which will grip or engage the object to be fished out of the well at different points thereby insuring a positive hold on the latter until the object has been brought to the surface of the well.

It is also an object of the invention to provide a device of this character which is simple in construction and can be readily taken apart for the purpose of repairs or inserting any new parts in assembling.

With the preceding and other objects and advantages in mind, the invention consists in the novel combination of elements, constructions and arrangement of parts and operation to be hereinafter specifically referred to, claimed and illustrated in the accompanying drawing wherein—

Figure 1:
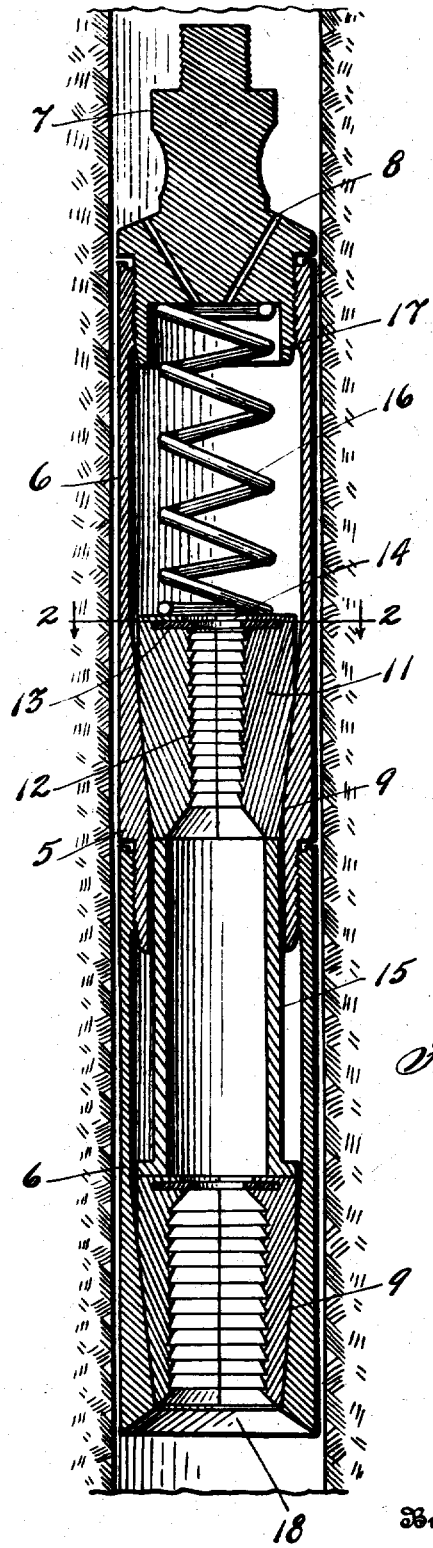
Figure 1 is a longitudinal sectional view of a well fishing tool constructed in accordance with my invention.
Figure 2:
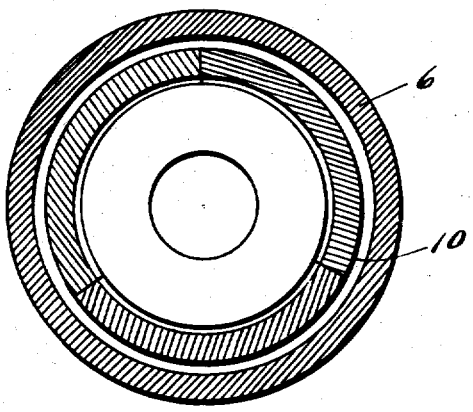
Figure 2 is a horizontal sectional view taken on line 2—2 of the same.

Referring in detail to the drawing wherein corresponding characters of reference denote corresponding parts throughout the several views, the numeral 5 designates a tubular or cylindrical casing embodying tube sections or nipples 6. Threadedly engaged with the upper end of the tubular casing 5 is a head or stock 7 adapted to be connected in the usual manner with the well drilling or lowering apparatus, not shown, the head being provided with divergent openings 8 for the purpose of permitting gas, water or the like to escape from the well while the device is lowered therein.

The inner face of each of the pipe sections 6 is provided with an inclined or beveled surface 9, the inclination of which is increased towards the lower end thereof. For cooperation with each of the beveled surfaces 9 a set of gripping elements or slips 10 are employed. As both of these sets of slips are substantially identical, a detailed description of one will apply to both. These slips comprise segments 11 which have their outer faces longitudinally tapered to extend parallel to the inclined surfaces 9 while their inner faces are serrated as at 12 to engage the object to be lifted.

In order to lock each set of slips or gripping elements together to prevent them from movement with respect to each other they are provided with circumferential grooves in their inner faces adjacent their upper ends and accommodated therein are annular flanges 13 formed on rings 14. It will be thus seen that the slips will move laterally with respect to each other but cannot move longitudinally with respect to each other. However the slips may be connected in any other suitable manner. A sleeve 15 is arranged within the casing tube 5 and is interposed between each set of slips or gripping elements 10 so that upon engagement of the lower set of slips with the object, the latter will be raised and through the instrumentality of this tubular member 15 the upper set of slips or gripping elements will be raised.

A coil spring 16 is arranged in the tubular member or casing 5 and is interposed between the uppermost set of slips, the head or stock 7 and normally urges both sets of slips downwardly. A depending flange 17 is carried by the head or stock 7 and encircles the upper end of the spring 16. The lower section or nipple 6 has an inwardly beveled guide face 18 at its bottom forming a guide shoe.

In the operation of the device, the casing 5 is lowered into the well until the slips 10 engage the object and which causes the latter to ride upwardly over the inclined surface 9 until the slips have moved laterally sufficiently to receive the object therebetween. The coil spring 16 urging both sets of slips downwardly causes the latter to positively grip the object and hold the same within the casing until the latter has been drawn to the surface of the well.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to secure by Letters Patent is:

1. A tool of the class described comprising a tubular casing composed of two tube sections threaded into engagement with one another, the inner walls of said tube sections adjacent their lower ends being increased in thickness greater toward the extreme lower ends to provide inclined walls, a series of segments forming a pair of gripping members, the outer faces of said segments being inclined coincident to the inclination of the walls at the lower ends of said tubular sections to cooperate with the latter, the inner faces of said segments being serrated and the upper peripheral faces of said gripping members being offset to provide circumferential grooves, ring members inserted in said grooves to retain the elements of said gripping members in position with respect to one another, an additional tubular section spacing said gripping members from one another and contacting therewith, a head member threaded into engagement with the upper end of the upper tubular section of the casing, and a coil spring disposed between said head member and the upper end of the upper gripping element, as and for the purposes described.

2. In a fishing tool, a head, a plurality of connected tubular sections secured in stages below said head, a tapered seat formed on the inner surface of each section, toothed jaws fitting within each said seat, said jaws being of decreasing thickness in each set from the upper set downwardly and resilient means holding said jaws downwardly in their seats.

3. A multiple stage fishing tool, comprising a head, a plurality of nipples detachably connected together at their adjacent ends, the upper one being attached to said head, downwardly tapered seats formed in each of said nipples, jaws fitting within said seats, said jaws having vertical inner toothed faces, means to hold said jaws in horizontal alignment, and a shoe at the lower end of the bottom nipple.

4. A multiple stage fishing tool comprising a head, a plurality of nipples arranged in stages below said head, a downwardly tapered inner seat on each nipple, a plurality of jaws on each seat, means to hold said jaws in horizontal alignment, each of said sets of jaws being of uniform internal diameter, the thickness of adjacent sets of jaws decreasing from the upper nipple to the lower nipple, and means to guide the work into the said nipples.

5. In a fishing tool, a head, a tubular casing depending from the head and having inclined slip actuating faces at different elevations, and a separate set of slips engaging each face, all of said slips being resiliently sustained, the lower set of slips having a larger work-receiving diameter than the upper set of slips.

6. In a fishing tool, a head, a tubular casing depending from the head and having inclined slip actuating faces at different elevations, and a separate set of slips engaging each face, all of said slips being resiliently sustained, the lower set of slips having a larger work-receiving diameter than the upper set of slips, the casing being separable between its inclined faces.

In testimony whereof I affix my signature.

EDWARD J. MUCH.